United States Patent
Vazhenin et al.

(10) Patent No.: US 10,169,155 B2
(45) Date of Patent: Jan. 1, 2019

(54) SYSTEM AND METHOD FOR SYNCHRONIZATION IN A CLUSTER ENVIRONMENT

(71) Applicant: EMC IP Holding Company LLC, Hopkinton, MA (US)

(72) Inventors: Maksim Vazhenin, St. Petersburg (RU); Sergey Storozhevykh, St. Petersburg (RU); Ilya Volzhev, St. Petersburg (RU); Vadim Nikolaevich Agarkov, St. Petersburg (RU); Mikhail Edkov, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 15/290,302

(22) Filed: Oct. 11, 2016

(65) Prior Publication Data

US 2017/0286227 A1 Oct. 5, 2017

(30) Foreign Application Priority Data

Mar. 30, 2016 (RU) .............................. 2016111898

(51) Int. Cl.
*G06F 11/14* (2006.01)

(52) U.S. Cl.
CPC ...... *G06F 11/1415* (2013.01); *G06F 11/1474* (2013.01); *G06F 2201/805* (2013.01); *G06F 2201/85* (2013.01)

(58) Field of Classification Search
CPC ............. G06F 11/2076; G06F 11/2082; G06F 11/2094; G06F 11/2097; G06F 11/1441; G06F 11/1072; G06F 11/1092
See application file for complete search history.

(56) References Cited

U.S. PATENT DOCUMENTS

| | | | | |
|---|---|---|---|---|
| 8,090,979 B2 * | 1/2012 | Watanabe | ........... | G06F 11/2069 714/4.1 |
| 2010/0313068 A1 * | 12/2010 | Watanabe | ........... | G06F 11/2069 714/6.12 |
| 2014/0237179 A1 * | 8/2014 | Iwamura | ............. | G06F 11/2076 711/114 |
| 2014/0325116 A1 * | 10/2014 | McKelvie | ........... | G06F 12/0246 711/103 |
| 2016/0077930 A1 * | 3/2016 | McKelvie | ........... | G06F 12/0246 714/19 |
| 2017/0177243 A1 * | 6/2017 | Trika | ........................ | G06F 1/26 |

* cited by examiner

*Primary Examiner* — Nadeem Iqbal
(74) *Attorney, Agent, or Firm* — Brian J. Colandreo; Mark H. Whittenberger; Holland & Knight LLP

(57) ABSTRACT

A method, computer program product, and computer system for performing, via a first computing device, a copy sweep operation to a first range of data on a source storage device. It may be determined that the copy sweep operation has failed. A message may be sent to a second computing device to suspend I/O operations to the first range of data. The copy sweep operation may be retried based upon, at least in part, determining that the copy sweep operation has failed, wherein the copy sweep operation may be retried without the first computing device receiving acknowledgement that the second computing device is suspending the I/O operations to the first range of data.

20 Claims, 4 Drawing Sheets

SYSTEM AND METHOD FOR SYNCHRONIZATION IN A CLUSTER ENVIRONMENT

CROSS-REFERENCE TO RELATED APPLICATION

The subject application claims priority to Russian Patent Application No. 2016111898, filed on Mar. 30, 2016 entitled "System and Method for Synchronization in a Cluster Environment". The entire content of the application is herein incorporated by reference.

BACKGROUND

Clustered systems, such as "active-active" clustered systems, may enable multiple nodes in a high availability cluster to simultaneously have read-write access to the same storage device (e.g., Logical Unit Number). High availability clusters may provide continued service for the users attempting to access the storage device(s), even during migration and synchronization of data from a source storage device to a target storage device.

BRIEF SUMMARY OF DISCLOSURE

In one example implementation, a method, performed by one or more computing devices, may include but is not limited to performing, via a first computing device, a copy sweep operation to a first range of data on a source storage device. It may be determined that the copy sweep operation has failed. A message may be sent to a second computing device to suspend I/O operations to the first range of data. The copy sweep operation may be retried based upon, at least in part, determining that the copy sweep operation has failed, wherein the copy sweep operation may be retried without the first computing device receiving acknowledgement that the second computing device is suspending the I/O operations to the first range of data.

One or more of the following example features may be included. A message may be sent to the second computing device to resume I/O operations to the first range of data based upon, at least in part, success of the copy sweep operation to the first range of data as a result of retrying the copy sweep operation. Determining that the copy sweep operation has failed may include determining that data read from the first range of data on the source storage device at a first time is different than data read from the first range of data from the source storage device at a second time. Sending the message to the second computing device to suspend I/O operations to the first range of data may be based upon, at least in part, determining that the data read from the first range of data on the source storage device at the first time is different than the data read from the first range of data read on the source storage device at the second time. The message sent to the second computing device to suspend I/O operations to the first range of data may include at least one of a start value of the first range of data, an end value of the first range of data, and a predetermined time period during which the second computing device is to suspend I/O operations to the first range of data. It may be determined that the copy sweep operation to the first range of data is not completed after the predetermined time period, and a message may be sent to the second computing device to resume I/O operations to the first range of data based upon, at least in part, determining that the copy sweep operation to the first range of data is not completed after the predetermined time period. I/O operations may be received from the second computing device to the first range of data, wherein the I/O operations may be received from the second computing device after the predetermined time period without the second computing device receiving a message to resume I/O operations to the first range of data.

In another example implementation, a computing system includes a processor and a memory configured to perform operations that may include but are not limited to performing, via a first computing device, a copy sweep operation to a first range of data on a source storage device. It may be determined that the copy sweep operation has failed. A message may be sent to a second computing device to suspend I/O operations to the first range of data. The copy sweep operation may be retried based upon, at least in part, determining that the copy sweep operation has failed, wherein the copy sweep operation may be retried without the first computing device receiving acknowledgement that the second computing device is suspending the I/O operations to the first range of data.

One or more of the following example features may be included. A message may be sent to the second computing device to resume I/O operations to the first range of data based upon, at least in part, success of the copy sweep operation to the first range of data as a result of retrying the copy sweep operation. Determining that the copy sweep operation has failed may include determining that data read from the first range of data on the source storage device at a first time is different than data read from the first range of data from the source storage device at a second time. Sending the message to the second computing device to suspend I/O operations to the first range of data may be based upon, at least in part, determining that the data read from the first range of data on the source storage device at the first time is different than the data read from the first range of data read on the source storage device at the second time. The message sent to the second computing device to suspend I/O operations to the first range of data may include at least one of a start value of the first range of data, an end value of the first range of data, and a predetermined time period during which the second computing device is to suspend I/O operations to the first range of data. It may be determined that the copy sweep operation to the first range of data is not completed after the predetermined time period, and a message may be sent to the second computing device to resume I/O operations to the first range of data based upon, at least in part, determining that the copy sweep operation to the first range of data is not completed after the predetermined time period. I/O operations may be received from the second computing device to the first range of data, wherein the I/O operations may be received from the second computing device after the predetermined time period without the second computing device receiving a message to resume I/O operations to the first range of data.

In another example implementation, a computer program product resides on a computer readable storage medium that has a plurality of instructions stored on it. When executed by a processor, the instructions cause the processor to perform operations that may include but are not limited to performing, via a first computing device, a copy sweep operation to a first range of data on a source storage device. It may be determined that the copy sweep operation has failed. A message may be sent to a second computing device to suspend I/O operations to the first range of data. The copy sweep operation may be retried based upon, at least in part, determining that the copy sweep operation has failed, wherein the copy sweep operation may be retried without the first computing device receiving acknowledgement that the second computing device is suspending the I/O operations to the first range of data.

One or more of the following example features may be included. A message may be sent to the second computing device to resume I/O operations to the first range of data based upon, at least in part, success of the copy sweep operation to the first range of data as a result of retrying the copy sweep operation. Determining that the copy sweep operation has failed may include determining that data read from the first range of data on the source storage device at a first time is different than data read from the first range of data from the source storage device at a second time. Sending the message to the second computing device to suspend I/O operations to the first range of data may be based upon, at least in part, determining that the data read from the first range of data on the source storage device at the first time is different than the data read from the first range of data read on the source storage device at the second time. The message sent to the second computing device to suspend I/O operations to the first range of data may include at least one of a start value of the first range of data, an end value of the first range of data, and a predetermined time period during which the second computing device is to suspend I/O operations to the first range of data. It may be determined that the copy sweep operation to the first range of data is not completed after the predetermined time period, and a message may be sent to the second computing device to resume I/O operations to the first range of data based upon, at least in part, determining that the copy sweep operation to the first range of data is not completed after the predetermined time period. I/O operations may be received from the second computing device to the first range of data, wherein the I/O operations may be received from the second computing device after the predetermined time period without the second computing device receiving a message to resume I/O operations to the first range of data.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
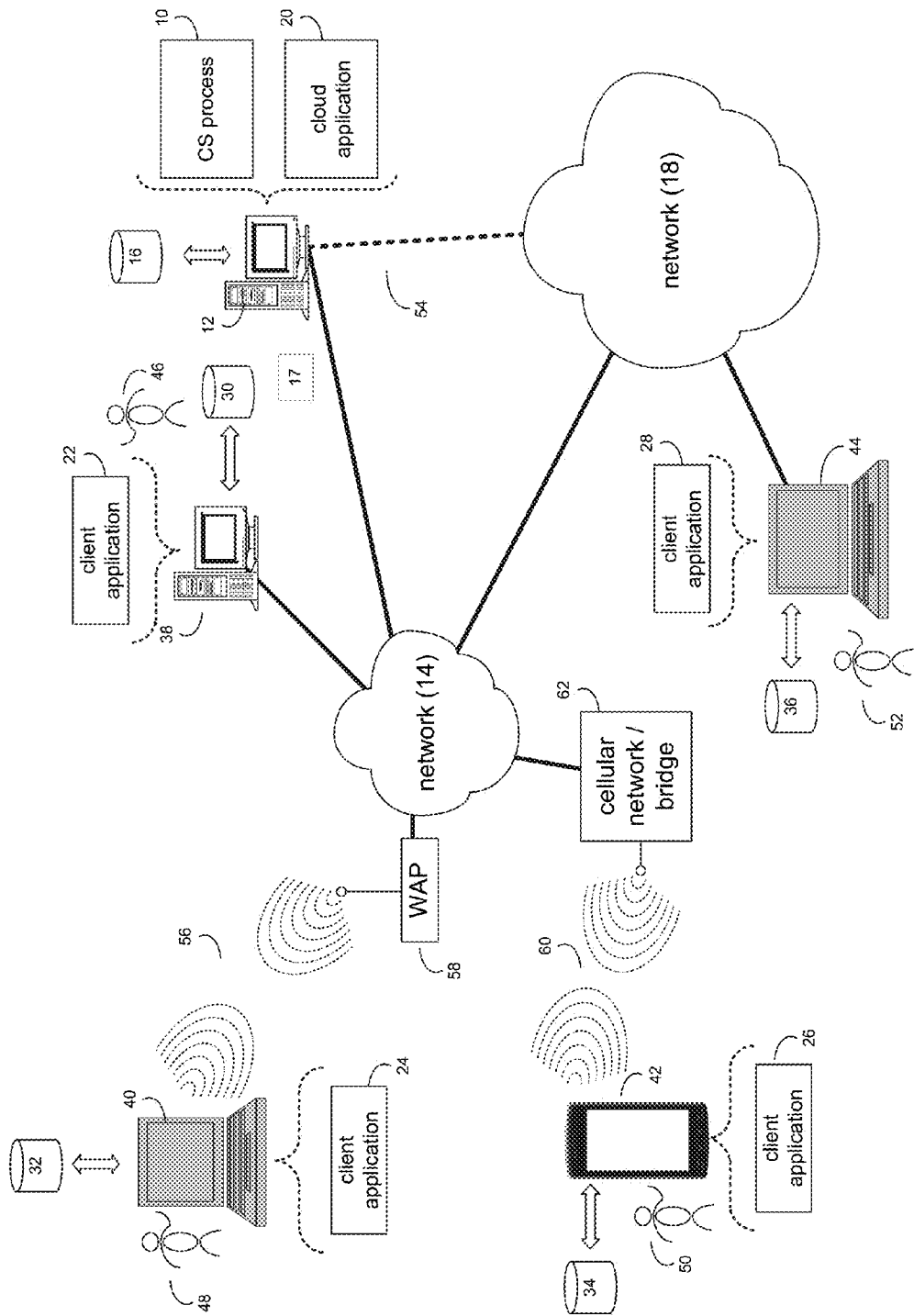
FIG. 1 is an example diagrammatic view of a CS process coupled to a distributed computing network according to one or more example implementations of the disclosure.

System Overview:

Generally, in some implementations, clustered systems, such as "active-active" clustered systems, may enable multiple nodes in a high availability cluster to simultaneously have read-write access to the same storage device (e.g., Logical Unit Number). In some implementations, high availability clusters may provide continued service for the users attempting to access the storage device(s), even during migration and synchronization of data from a source storage device to a target storage device. Typically, in some implementations, synchronization of the source storage device may involve cloning any new Input/Output (I/O) to both the source storage device and target storage device while incrementally (e.g., block by block) copying the source to the target. In some implementations, synchronization issues may become more difficult in active-active cluster environments when several hosts may access the same source storage device. In some implementations, this may be due to the node which performs the "copy sweep" handling conflicts between the I/Os from all nodes capable of accessing the source storage device concurrently with the copy sweep to help guarantee that the storage device may be synchronized correctly.

In some implementations, while the disclosure may be described using an "active-active" clustered environment, it will be appreciated that other types of environments may be used without departing from the scope of the disclosure. As such, the description of an "active-active" clustered environment should be taken as example only and not to otherwise limit the scope of the disclosure. As will be discussed in greater detail below, in some implementations, the disclosure may describe a process for source and target storage device synchronization in, e.g., active-active cluster environments, which may involve minimal communication overhead between nodes for copy sweep than is typical. In some implementations, the process may be beneficial in situations where synchronization may be unable to move forward (e.g., when data on some range on the storage device (e.g., "hot spot") is frequently changing with very small timeouts); however, the disclosure may be beneficial in other situations without departing from the scope of the disclosure. In some implementations, as will be discussed in greater detail below, the disclosure may provide a simplified message protocol and may speed copy sweep by, e.g., eliminating the need to wait for acknowledgment messages from the cluster nodes.

In some implementations, all nodes (e.g., client electronic devices) may clone all new application write requests to a target storage device. In some implementations, an application write may be written first on a source storage device, and after the write is completed, the write may be cloned to the target storage device. In some implementations, the target storage device may be protected from the application writes on all nodes (e.g., applications may not write to target).

In some implementations, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof. In certain implementations, a computing device may be a physical or virtual device. In many implementations, a computing device may be any device capable of performing operations, such as whether a dedicated processor, a portion of a processor, a virtual processor, a portion of a virtual processor, portion of a virtual device, or a virtual device. A processor may be a virtual processor or a physical processor. Logic may be distributed across several processors or virtual processors to execute the logic.

Referring now to the example implementation of FIG. 1, there is shown copy sweep (CS) process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, CS process 10 may perform, via a first computing device, a copy sweep operation to a first range of data on a source storage device. In some implementations, CS process 10 may determine that the copy sweep operation has failed. In some implementations, CS process 10 may send a message (e.g., message 17) to a second computing device to suspend I/O operations to the first range of data. In some implementations, CS process 10 may retry the copy sweep operation based upon, at least in part, determining that the copy sweep operation has failed, wherein the copy sweep operation may be retried without the first computing device receiving acknowledgement that the second computing device is suspending the I/O operations to the first range of data.

In some implementations, the instruction sets and subroutines of GC process 10, which may be stored on storage device 16 coupled to computer 12, may be executed by one or more processors (not shown) and one or more memory architectures (not shown) included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. CS process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from EMC Corporation of Hopkinton, Mass. It will be appreciated that other cloud computing environments may be used without departing from the scope of the disclosure.

In some implementations, computer 12 may execute a cloud application (e.g., cloud application 20), examples of which may include, but are not limited to, e.g., a storage system application, a cloud computing application, a data synchronization application, a data migration application, or other application that allows for the implementation of highly available data in a clustered environment (or the like). CS process 10 and/or cloud application 20 may be accessed via client applications 22, 24, 26, 28. CS process 10 may be a standalone application, or may be an applet/application/script/extension that may interact with and/or be executed within cloud application 20, a component of cloud application 20, and/or one or more of client applications 22, 24, 26, 28. Cloud application 20 may be a standalone application, or may be an applet/application/script/extension that may interact with and/or be executed within CS process 10, a component of CS process 10, and/or one or more of client applications 22, 24, 26, 28. One or more of client applications 22, 24, 26, 28 may be a standalone application, or may be an applet/application/script/extension that may interact with and/or be executed within and/or be a component of CS process 10 and/or cloud application 20. Examples of client applications 22, 24, 26, 28 may include, but are not limited to, e.g., a storage system application, a cloud computing application, a data synchronization application, a data migration application, or other application that allows for the implementation of highly available data in a clustered environment (or the like), a standard and/or mobile web browser, an email application (e.g., an email client application), a textual and/or a graphical user interface, a customized web browser, a plugin, an Application Programming Interface (API), a worker process application, or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

In some implementations, storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of GC process 10 (and vice versa). Accordingly, GC process 10 may be a purely server-side application, a purely client-side application, or a hybrid server-side/client-side application that is cooperatively executed by one or more of client applications 22, 24, 26, 28 and/or GC process 10.

In some implementations, one or more of client applications 22, 24, 26, 28 may be configured to effectuate some or all of the functionality of cloud application 20 (and vice versa). Accordingly, cloud application 20 may be a purely server-side application, a purely client-side application, or a hybrid server-side/client-side application that is cooperatively executed by one or more of client applications 22, 24, 26, 28 and/or cloud application 20. As one or more of client applications 22, 24, 26, 28, CS process 10, and cloud application 20, taken singly or in any combination, may effectuate some or all of the same functionality, any description of effectuating such functionality via one or more of client applications 22, 24, 26, 28, CS process 10, cloud application 20, or combination thereof, and any described interaction(s) between one or more of client applications 22, 24, 26, 28, CS process 10, cloud application 20, or combination thereof to effectuate such functionality, should be taken as an example only and not to limit the scope of the disclosure.

In some implementations, users 46, 48, 50, 52 may access computer 12 and CS process 10 (e.g., using one or more of client electronic devices 38, 40, 42, 44) directly through network 14 or through secondary network 18. Further, computer 12 may be connected to network 14 through secondary network 18, as illustrated with phantom link line 54. CS process 10 may include one or more user interfaces, such as browsers and textual or graphical user interfaces, through which users 46, 48, 50, 52 may access CS process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
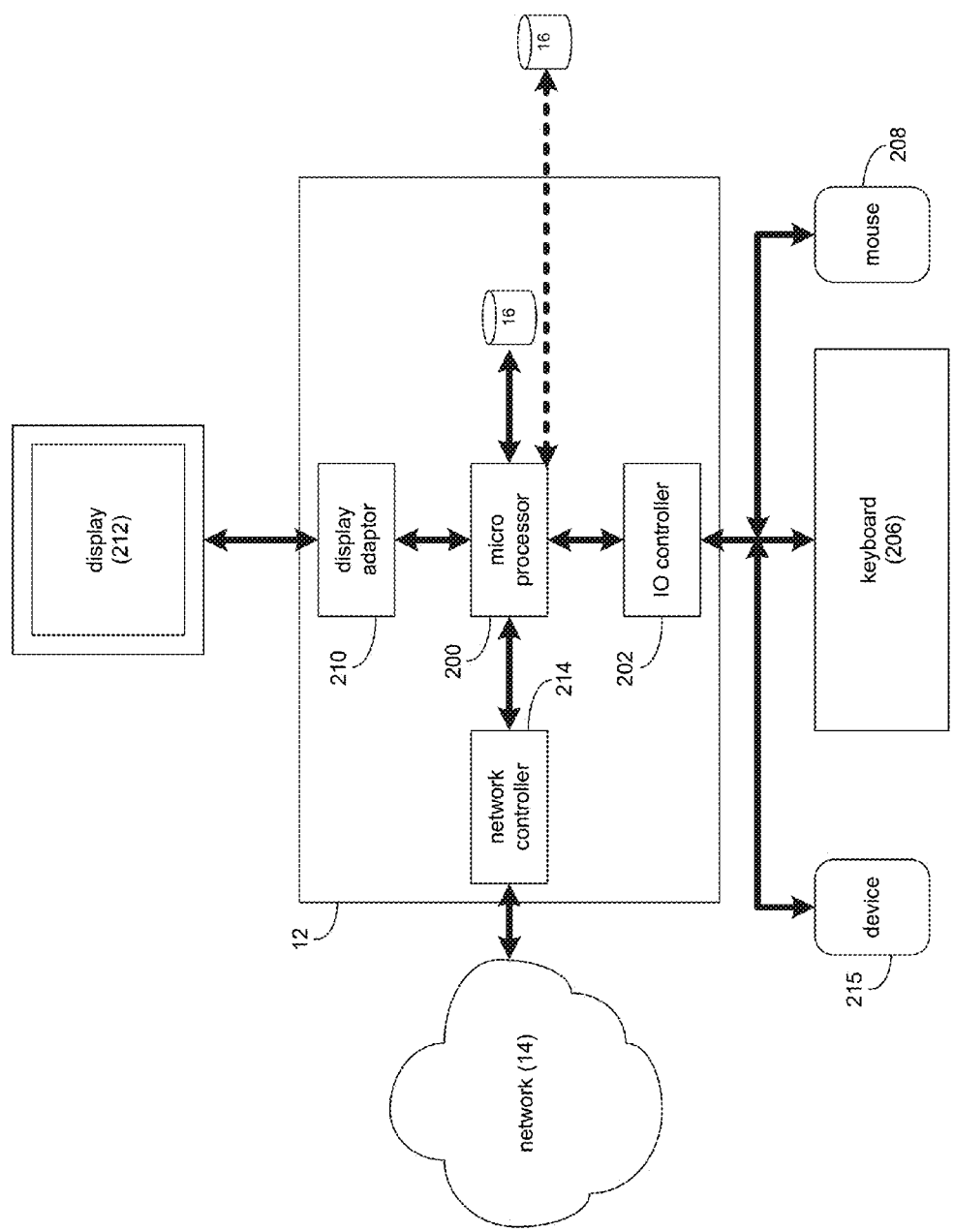
FIG. 2 is an example diagrammatic view of a client electronic device of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, CS process 10 may be substituted for computer 12 (in whole or in part) within FIG. 2, examples of which may include but are not limited to client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 3:
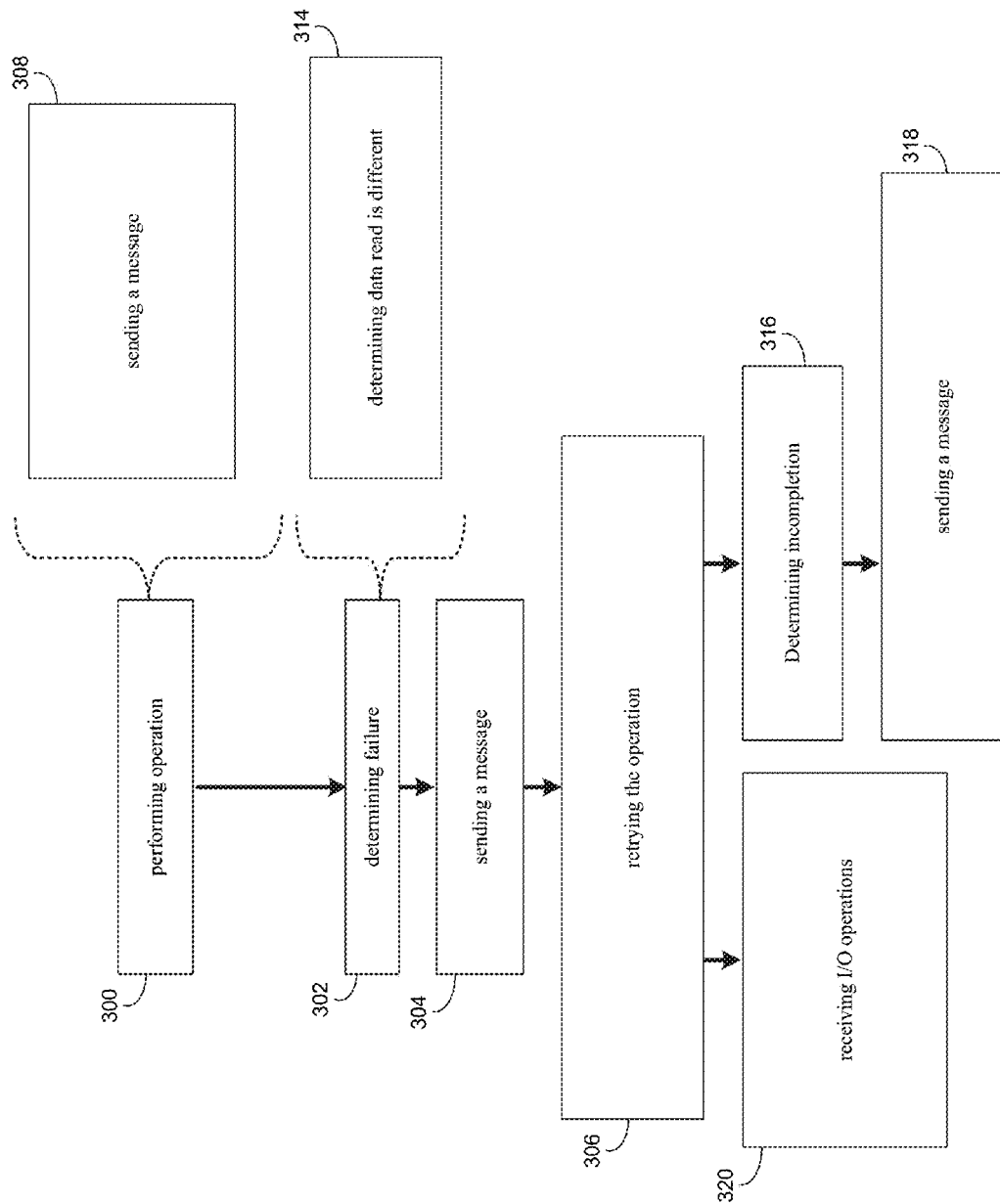
FIG. 3 is an example flowchart of the CS process of FIG. 1 according to one or more example implementations of the disclosure.
Figure 4:
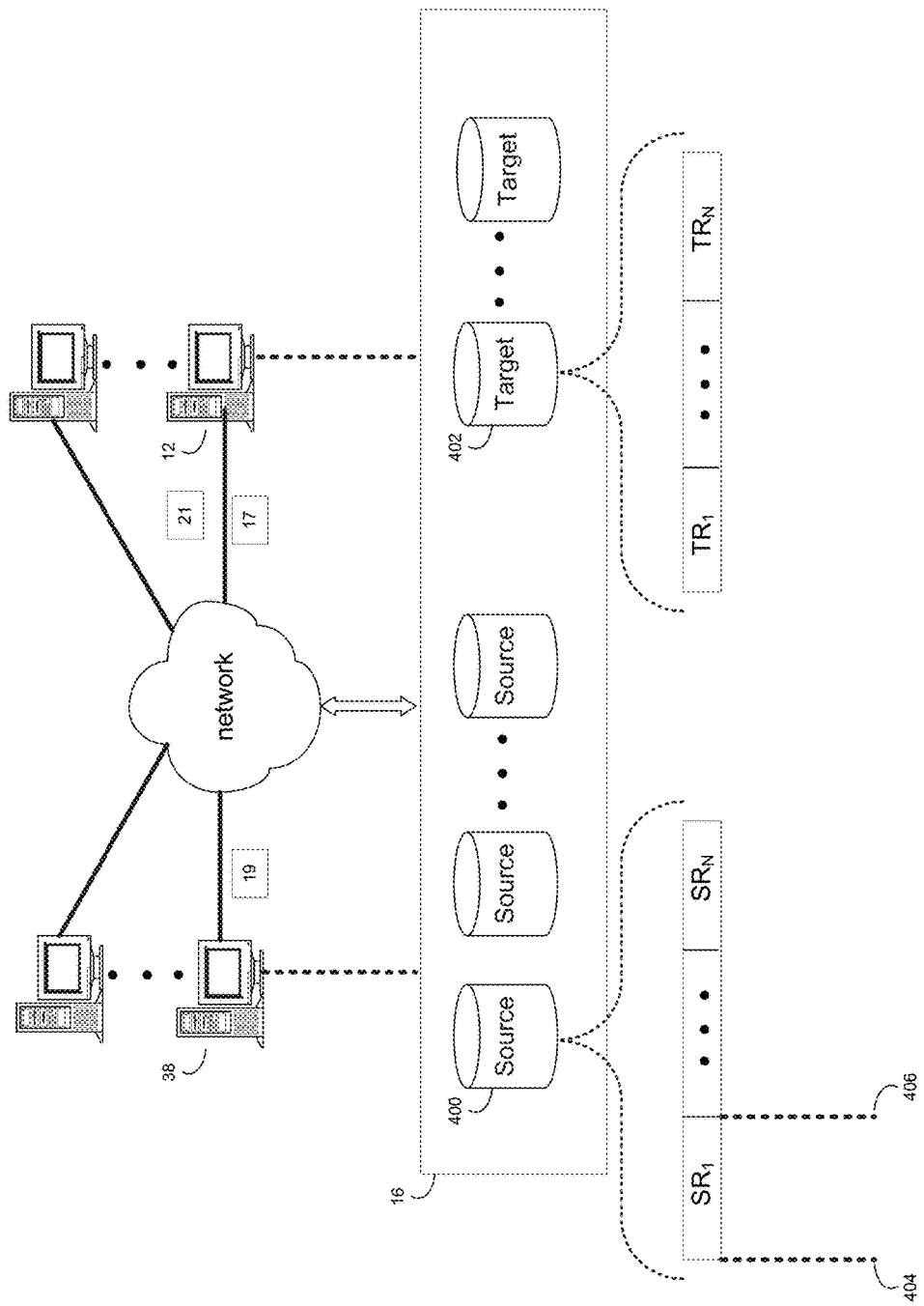
FIG. 4 is an example diagrammatic view of source and target storage device ranges according to one or more example implementations of the disclosure.

The CS Process:

As discussed above and referring also at least to the example implementations of FIGS. 3-4, copy sweep (CS) process 10 may perform 300, via a first computing device, a copy sweep operation to a first range of data on a source storage device. CS process 10 may determine 302 that the copy sweep operation has failed. CS process 10 may send 304 a message to a second computing device to suspend I/O operations to the first range of data. CS process 10 may retry 306 the copy sweep operation based upon, at least in part, determining 302 that the copy sweep operation has failed, wherein the copy sweep operation may be retried 306 without the first computing device receiving acknowledgement that the second computing device is suspending the I/O operations to the first range of data.

In some implementations, copy sweep (CS) process 10 may perform 300, via a first computing device, a copy sweep operation to a first range of data on a source storage device. For example, and referring at least to FIG. 4, an example data array (shown by example as storage device 16) may include one or more source storage devices (e.g., source storage device 400) and/or one or more target storage devices (e.g., storage target device 402). CS process 10 may execute a migration of data from source 400 to target 402. As will be appreciated by those skilled in the art, source 400 and target 402 may not be synchronized when migration starts. In some implementations, CS process 10 may enable the synchronization of source 400 and target 402 while application Input/Outputs (I/Os) are running on source 400. In some implementations, this may be achieved by CS process 10 cloning new I/Os from source 400 to target 402 while copying source 400 to target 402 (e.g., block by block or other copying method). In some implementations, synchronization may be considered complete when copy sweep ends. In some implementations, after synchronization is complete, only cloning of new I/Os may be needed to keep the storage devices synchronized. In some implementations, it any environmental configuration of storage device 16 may be used without departing from the scope of the disclosure. In some implementations, for example, storage device 16 may a distributed data array, RAID array, etc. In some implementations, as such, the particular environmental configuration shown should be taken as example only and not to otherwise limit the scope of the disclosure.

In some implementations, CS process 10 may be considered a "coordinator", which may, at least in part, perform the copy sweep operation. In some implementations, CS process 10 may include multiple coordinators for different copy sweep ranges (e.g., if the storage device(s) is split to several ranges and each computing device copies its own range). In some implementations, for any copy sweep range, there may be only one coordinator. In some implementations, client electronic device 38 (e.g., via client application 22) may be considered a "worker", which may, at least in part, run on client electronic device 38 and may respond to coordinator requests. In some implementations, as shown at least in the example FIG. 1, there may be multiple client electronic devices in the ECS cluster. In some implementations, the first computing device and the second computing device may run on the same computing device (e.g., node)

In some implementations, performing 300 the copy sweep operation may include CS process 10 reading data from the first range of data on the source storage device at a first time, storing the data from the first range of data to a target storage device, and reading data from the first range of data on the source storage device at a second time. For instance, assume for example purposes only that a copy sweep operation is being attempted by CS process 10. In the example, CS process 10 may read data from the first source range (e.g., $SR_1$) of data on source 400 at a first time (e.g., $T_1$), store the data from SR1 to a target range (e.g., $TR_1$) of target 402 at $T_3$, and read data from the first source range (e.g., $SR_1$) of data on source 400 at $T_4$. In the example, if $SR_1$ at $T_1$ is equal to $SR_1$ at $T_4$, then it may be assumed that synchronization between $SR_1$ and $TR_1$ is complete. In the example, the first range may be, e.g., 256 kb, however, other ranges may be used without departing from the scope of the disclosure. For example, depending on the underlying I/O stack, the first range may be extended up to the entire storage device range. In some implementations, after completion of copy sweep for SR1, a next copy sweep operation may be executed on a next source range.

In some implementations, CS process 10 may determine 302 that the copy sweep operation has failed. For instance, in some implementations, determining 302 that the copy sweep operation has failed may include CS process 10 determining 314 that the data read from the first range of data on the source storage device at the first time is different than the data read from the first range of data from the source storage device at the second time. For instance, assume for example purposes only that another copy sweep operation is being attempted by CS process 10. In the example, CS process 10 may read data from the first source range (e.g., $SR_1$) of data on source 400 at a first time (e.g., $T_1$), and store the data from $SR_1$ to a target range (e.g., $TR_1$) of target 402 at $T_3$. Further assume that at $T_2$, client electronic device 38 writes data to $SR_1$. Further assume for this example that CS process 10 reads data from the first source range (e.g., $SR_1$) of data on source 400 at $T_4$. In the example, CS process 10 may determine 314 that the data stored at $SR_1$ at $T_1$ may not be equal to the data stored at $SR_1$ at $T_4$ (e.g., since data was written to SR1 at $T_2$ by client electronic device 38 before data was read from $SR_1$ at $T_4$). As a result, in this example, $SR_1$ at $T_1$ may not be equal to $SR_1$ at $T_4$, which may indicate that $SR_1$ at $T_4$ may not be equal to $TR_1$ at $T_4$. As such, in the example, CS process 10 may determine 302 that the copy sweep operation and synchronization between $SR_1$ and $TR_1$ has failed. Such a failure may occur for numerous reasons in this example, such as, e.g., a so-called "hot spot" occurring at $SR_1$, where multiple I/O operations are received at $SR_1$ in short intervals of time.

In some implementations, CS process 10 may send 304 a message to a second computing device to suspend I/O operations to the first range of data. For example, CS process 10 may send 304 a "suspend" message (e.g., message 17) to one or more client electronic devices (e.g., client electronic device 38) with access to source 400. In some implementations, the suspend message may instruct, e.g., client electronic device 38, to suspend I/O operations to $SR_1$. In some implementations, sending 304 the message to the second computing device to suspend I/O operations to the first range of data may be based upon, at least in part, determining 302 that the data read from the first range of data on the source storage device at the first time is different than the data read from the first range of data read on the source storage device at the second time. In some implementations, for instance, referring to the above example where CS process 10 may determine 314 that the data stored at $SR_1$ at $T_1$ may not be equal to the data stored at $SR_1$ at $T_4$ (e.g., since data was written to SR1 at $T_2$ by client electronic device 38 before data was read from $SR_1$ at $T_4$), based upon that determination 302/314, CS process 10 may send 304 message 17 to client electronic device 38 to suspend I/O operations to $SR_1$.

In some implementations, message 17 sent 304 to the second computing device (e.g., client electronic device 38) to suspend I/O operations to the first range of data may include at least one of a start value of the first range of data, an end value of the first range of data, and a predetermined time period during which the second computing device is to suspend I/O operations to the first range of data. For instance, assume for example purposes only that message 17 includes a start value of $SR_1$, the end value of $SR_1$, and an amount of time during which client electronic device 38 is to suspend I/O operations to $SR_1$ is (e.g., 30 seconds). In the example, the start value (e.g., start value 404) and end value (e.g., end value 406) of $SR_1$ may inform client electronic device 38 of the range from which suspension of I/O operations is to occur (e.g., $SR_1$), and the time period may inform client electronic device 38 of the 30 second duration that the suspension of I/O operations is to last. Thus, in the example, message 17 sent 304 to client electronic device 38 may include instructions for suspension of I/O operations to $SR_1$ for 30 seconds. In some implementations, message 17 may not preclude client electronic device 38 from sending I/O operations to a different range of source 400. In some implementations, it will be appreciated that other predetermined time periods may be used without departing from the scope of the disclosure. In some implementations, message 17 may lack the predetermined time period during which suspension of I/O operations is to occur. In some implementations, as such, the example description of message 17 including each of the start value of $SR_1$, end value of $SR_1$, and predetermined time period should be taken as example only, as any combination may be included with message 17.

In some implementations, CS process 10 may retry 306 the copy sweep operation based upon, at least in part, determining 302 that the copy sweep operation has failed, wherein the copy sweep operation may be retried 306 without the first computing device receiving acknowledgement that the second computing device is suspending the I/O operations to the first range of data. In some implementations, for instance, generally, after sending 304 message 17 to client electronic device 38 (and/or any other client electronic devices capable of accessing $SR_1$) to suspend I/O operations to $SR_1$, client electronic device 38 (and/or any other client electronic devices capable of accessing $SR_1$) may send an acknowledgement message (e.g., message 19) to CS process 10 that client electronic device 38 has received message 17. In some implementations, CS process 10 may wait until message 19 is received from client electronic device 38 (and/or any other client electronic devices capable of accessing $SR_1$) before retrying 306 the copy sweep operation, since it may be likely that another attempt at copy sweep may fail until it can be confirmed that I/O operations have ceased. In some implementations, this may provide a delay to the eventual completion of the copy sweep operation. As such, in some implementations, CS process 10 may retry 306 the copy sweep operation without waiting to receive message 19 from client electronic device 38 (and/or any other client electronic devices capable of accessing $SR_1$). In some implementations, a successful retry 306 of the copy sweep operation may provide the appropriate indication to CS process 10 that client electronic device 38 (and/or any other client electronic devices capable of accessing $SR_1$) has suspended I/O operations to $SR_1$, rather than relying on message 19. As such, in some implementations, the copy sweep operation may be resumed in a timelier fashion and with less transactional overhead that may be required if, e.g., CS process 10 were required to wait until message 19 is received from client electronic device 38 (and/or any other client electronic devices capable of accessing $SR_1$) before retrying 306 the copy sweep operation.

In some implementations, upon a failed copy sweep operation, CS process 10 may attempt to reduce the size of copy sweep (e.g., to less than 256 kb or smaller than the range of $SR_1$) and try again. In some implementations, the smallest size of the copy sweep may be, e.g., one storage device sector size. In some implementations, it will be appreciated that other values for the smallest size may be used without departing from the scope of the disclosure. In some implementations, as noted above, the range of $SR_1$ may be any range size. In some implementations, the retrying 306 of the copy sweep operation may be performed without reducing the size of copy sweep.

In some implementations, CS process 10 may determine 316 that the copy sweep operation to the first range of data is not completed after the predetermined time period, and a message may be sent 318 by CS process 10 to the second computing device to resume I/O operations to the first range of data based upon, at least in part, determining 316 that the copy sweep operation to the first range of data is not completed after the predetermined time period. For instance, assume for example purposes only that a hot spot has developed at $SR_1$, such that the copy sweep operation cannot be successfully completed. Further assume that while CS process 10 may be aware of a 30 second predetermined time period during which suspension of I/O operations is to occur, the message 17 sent 304 to client electronic device 38 lacks the above-noted 30 second predetermined time period during which suspension of I/O operations is to occur. In the example, CS process 10 may determine 316 that the copy sweep operation is not successfully completed within 30 seconds, and may send 318 a "resume" message (e.g., message 21) to client electronic device 38 (and/or any other client electronic devices capable of accessing $SR_1$) to resume I/O operations to $SR_1$. In some implementations, message 21 may include, e.g., the start value (e.g., start value 404) and end value (e.g., end value 406) of $SR_1$ to which I/O operations may be resumed. In some implementations, after determining 316 that the copy sweep operation to $SR_1$ is not completed after the predetermined time period, CS process 10 may stop the synchronization attempts, and may return an error message to alert the appropriate users (e.g., administrators) of the failure.

In some implementations, CS process 10 may include a predetermined number of retries that may be executed before sending 318 message 21 to client electronic device 38. In some implementations, CS process 10 may determine 316 that the copy sweep operation is not successfully completed within the predetermined number of retries (e.g., 5), and may send 318 a "resume" message (e.g., message 21) to client electronic device 38 (and/or any other client electronic devices capable of accessing $SR_1$) to resume I/O operations to $SR_1$.

In some implementations, message 21 may be sent 318 to client electronic device 38 (and/or any other client electronic devices capable of accessing $SR_1$) before expiration of the predetermined time period. In some implementations, for instance, CS process 10 may determine that the copy sweep operation is successfully completed before the expiration of the 30 second time period. In some implementations, rather than waiting for the 30 second expiration, CS process 10 may save time by (upon successful completion of the copy sweep operation) sending 318 message 21 to client electronic device 38 (and/or any other client electronic devices capable of accessing $SR_1$) to resume I/O operations to $SR_1$. In some implementations, CS process 10 may send 308 a message to the second computing device to resume I/O operations to the first range of data based upon, at least in part, success of the copy sweep operation to the first range of data as a result of retrying the copy sweep operation. For example, in some implementations, even without a predetermined time period for expiration, message 21 may be sent 308 to client electronic device 38 (and/or any other client electronic devices capable of accessing $SR_1$) upon a determination of a successful copy sweep operation.

In some implementations, CS process 10 may receive 320 I/O operations from the second computing device to the first range of data, wherein the I/O operations may be received 320 from the second computing device after the predetermined time period without the second computing device receiving a message to resume I/O operations to the first range of data. For instance, assume for example purposes only that a hot spot has developed at $SR_1$, such that the copy sweep operation cannot be successfully completed. Further assume that message 17 sent 304 to client electronic device 38 includes a, e.g., 30 second predetermined time period during which suspension of I/O operations is to occur. In the example, client electronic device 38 may determine that the copy sweep operation is not successfully completed within 30 seconds (e.g., since message 21 has not been received by client electronic device 38), and may resume sending I/O operations to $SR_1$, to be received 320 by CS process 10. As such, in some implementations, I/O operations may be resumed in a timelier fashion and with less transactional overhead that may be required if, e.g., client electronic device 38 was required to wait for the above-noted message 21 to resume I/O operations to $SR_1$.

It will be appreciated that, in some implementations, CS process 10 need not depend on any changes in the cluster which may occur while synchronization is in progress (e.g., some client electronic device is rebooted, evicted from the cluster, etc.). In some implementations, while CS process 10 is described with copy sweep applications, other applications involving data migration/synchronization may also benefit from the use of CS process 10. In some implementations, the use of a copy sweep operation should be taken as an example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   performing, via a first computing device, a copy sweep operation to a first range of data on a source storage device;
   determining that the copy sweep operation has failed;
   sending a message to a second computing device to suspend I/O operations to the first range of data; and
   retrying the copy sweep operation based upon, at least in part, determining that the copy sweep operation has failed, wherein the copy sweep operation is retried without the first computing device receiving acknowledgement that the I/O operations to the first range of data are suspended by the second computing device.

2. The computer-implemented method of claim 1 further comprising sending a message to resume I/O operations to the first range of data based upon, at least in part, success of the copy sweep operation to the first range of data as a result of retrying the copy sweep operation.

3. The computer-implemented method of claim 1 wherein determining that the copy sweep operation has failed includes determining that data read from the first range of data at a first time is different than data read from the first range of data at a second time.

4. The computer-implemented method of claim 3 wherein sending the message to suspend I/O operations to the first range of data is based upon, at least in part, determining that the data read from the first range of data on the source storage device at the first time is different than the data read from the first range of data at the second time.

5. The computer-implemented method of claim 1 wherein the message sent to suspend I/O operations to the first range of data includes at least one of a start value of the first range of data, an end value of the first range of data, and a predetermined time period during which to suspend I/O operations to the first range of data.

6. The computer-implemented method of claim 5 further comprising:
   determining that the copy sweep operation to the first range of data is not completed after the predetermined time period; and
   sending a message to resume I/O operations to the first range of data based upon, at least in part, determining that the copy sweep operation to the first range of data is not completed after the predetermined time period.

7. The computer-implemented method of claim 5 further comprising receiving I/O operations to the first range of data, wherein the I/O operations are received after the predetermined time period without receiving a message to resume I/O operations to the first range of data.

8. A computer program product residing on a non-transitory computer readable storage medium having a plurality of instructions stored thereon which, when executed across one or more processors, cause at least a portion of the one or more processors to perform operations comprising:
   performing, via a first computing device, a copy sweep operation to a first range of data on a source storage device;
   determining that the copy sweep operation has failed;
   sending a message to a second computing device to suspend I/O operations to the first range of data; and
   retrying the copy sweep operation based upon, at least in part, determining that the copy sweep operation has failed, wherein the copy sweep operation is retried without the first computing device receiving acknowledgement that the I/O operations to the first range of data are suspended by the second computing device.

9. The computer program product of claim 8 further comprising sending a message to resume I/O operations to the first range of data based upon, at least in part, success of the copy sweep operation to the first range of data as a result of retrying the copy sweep operation.

10. The computer program product of claim 8 wherein determining that the copy sweep operation has failed includes determining that data read from the first range of data at a first time is different than data read from the first range of data at a second time.

11. The computer program product of claim 10 wherein sending the message to suspend I/O operations to the first range of data is based upon, at least in part, determining that the data read from the first range of data on the source storage device at the first time is different than the data read from the first range of data at the second time.

12. The computer program product of claim 8 wherein the message sent to suspend I/O operations to the first range of data includes at least one of a start value of the first range of data, an end value of the first range of data, and a predetermined time period during which to suspend I/O operations to the first range of data.

13. The computer program product of claim 12 further comprising:
determining that the copy sweep operation to the first range of data is not completed after the predetermined time period; and
sending a message to resume I/O operations to the first range of data based upon, at least in part, determining that the copy sweep operation to the first range of data is not completed after the predetermined time period.

14. The computer program product of claim 12 further comprising receiving I/O operations to the first range of data, wherein the I/O operations are received after the predetermined time period without receiving a message to resume I/O operations to the first range of data.

15. A computing system including one or more processors and one or more memories configured to perform operations comprising:
performing, via a first computing device, a copy sweep operation to a first range of data on a source storage device;
determining that the copy sweep operation has failed;
sending a message to a second computing device to suspend I/O operations to the first range of data; and
retrying the copy sweep operation based upon, at least in part, determining that the copy sweep operation has failed, wherein the copy sweep operation is retried without the first computing device receiving acknowledgement that the second computing device is suspending the I/O operations to the first range of data.

16. The computing system of claim 15 further comprising sending a message to the second computing device to resume I/O operations to the first range of data based upon, at least in part, success of the copy sweep operation to the first range of data as a result of retrying the copy sweep operation.

17. The computing system of claim 15 wherein determining that the copy sweep operation has failed includes determining that data read from the first range of data on the source storage device at a first time is different than data read from the first range of data from the source storage device at a second time.

18. The computing system of claim 17 wherein sending the message to the second computing device to suspend I/O operations to the first range of data is based upon, at least in part, determining that the data read from the first range of data on the source storage device at the first time is different than the data read from the first range of data read on the source storage device at the second time.

19. The computing system of claim 15 wherein the message sent to the second computing device to suspend I/O operations to the first range of data includes at least one of a start value of the first range of data, an end value of the first range of data, and a predetermined time period during which the second computing device is to suspend I/O operations to the first range of data.

20. The computing system of claim 19 further comprising receiving I/O operations from the second computing device to the first range of data, wherein the I/O operations are received from the second computing device without the second computing device receiving a message to resume I/O operations to the first range of data.

* * * * *